(12) United States Patent
Opshaug et al.

(10) Patent No.: US 7,498,873 B2
(45) Date of Patent: Mar. 3, 2009

(54) WIDE-LANE PSEUDORANGE MEASUREMENTS USING FM SIGNALS

(75) Inventors: Guttorm Opshaug, Menlo Park, CA (US); David Burgess, Fairfield, CA (US); George Flammer, Cupertino, CA (US); Scott Furman, Menlo Park, CA (US); Andy Lee, Union City, CA (US); Matthew Rabinowitz, Portola Valley, CA (US); Harvind Samra, Fairfield, CA (US)

(73) Assignee: Rosom Corporation, Mountain View, CA (US)

( * ) Notice: Subject to any disclaimer, the term of this patent is extended or adjusted under 35 U.S.C. 154(b) by 323 days.

(21) Appl. No.: 11/554,765

(22) Filed: Oct. 31, 2006

(65) Prior Publication Data
US 2007/0131079 A1 Jun. 14, 2007

Related U.S. Application Data

(60) Provisional application No. 60/732,558, filed on Nov. 2, 2005.

(51) Int. Cl.
*G01S 1/00* (2006.01)
*H03D 3/00* (2006.01)
*H04B 1/16* (2006.01)
(52) U.S. Cl. ....................... 329/315; 342/350
(58) Field of Classification Search .............. 329/315; 342/350; 455/205, 214, 337
See application file for complete search history.

(56) References Cited

U.S. PATENT DOCUMENTS

| | | | |
|---|---|---|---|
| 4,555,707 A | 11/1985 | Connelly | |
| 4,652,884 A | 3/1987 | Starker | |
| 4,700,306 A | 10/1987 | Wallmander | |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |

(Continued)

FOREIGN PATENT DOCUMENTS

DE 3242997 A1 5/1984

(Continued)

OTHER PUBLICATIONS

U.S. Appl. No. 10/008,613, Pierce et al.

(Continued)

*Primary Examiner*—David Mis
(74) *Attorney, Agent, or Firm*—Richard A. Dunning, Jr.

(57) ABSTRACT

Apparatus having corresponding methods and computer-readable media comprises a receiver to receive a wireless stereo frequency-modulation (FM) signal comprising a plurality of spectral signal components including a first tone and one or more frequency bands; one or more tone generators each to generate a respective second tone based on a respective one of the frequency bands; a plurality of phase circuits each to measure a phase of a respective one of the first and second tones; and a difference element to determine a phase difference between two of the phases.

24 Claims, 3 Drawing Sheets

U.S. PATENT DOCUMENTS

| | | | |
|---|---|---|---|
| 5,504,492 | A | 4/1996 | Class et al. |
| 5,510,801 | A | 4/1996 | Engelbrecht et al. |
| 5,604,765 | A | 2/1997 | Bruno et al. |
| 5,630,206 | A | 5/1997 | Urban et al. |
| 5,648,982 | A | 7/1997 | Durrant et al. |
| 5,774,829 | A | 6/1998 | Cisneros et al. |
| 5,920,284 | A | 7/1999 | Victor |
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,215,778 | B1 | 4/2001 | Lomp et al. |
| 6,289,280 | B1 | 9/2001 | Fernandez-Corbaton et al. |
| 6,317,452 | B1 | 11/2001 | Durrant et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,433,740 | B1 | 8/2002 | Gilhousen |
| 6,437,832 | B1 | 8/2002 | Grabb et al. |
| 6,522,297 | B1 | 2/2003 | Rabinowitz et al. |
| 6,559,800 | B2 | 5/2003 | Rabinowitz et al. |
| 6,590,529 | B2 | 7/2003 | Schwoegler |
| 6,646,603 | B2 | 11/2003 | Dooley et al. |
| 6,717,547 | B2 | 4/2004 | Spilker, Jr. et al. |
| 6,727,847 | B2 | 4/2004 | Rabinowitz et al. |
| 6,753,812 | B2 | 6/2004 | Rabinowitz et al. |
| 6,806,830 | B2 | 10/2004 | Panasik et al. |
| 6,839,024 | B2 | 1/2005 | Spilker, Jr. et al. |
| 6,859,173 | B2 | 2/2005 | Spilker, Jr. et al. |
| 6,861,984 | B2 | 3/2005 | Rabinowitz et al. |
| 6,879,286 | B2 | 4/2005 | Rabinowitz et al. |
| 6,914,560 | B2 | 7/2005 | Spilker, Jr. et al. |
| 6,917,328 | B2 | 7/2005 | Rabinowitz et al. |
| 6,937,866 | B2 | 8/2005 | Duffett-Smith et al. |
| 6,952,182 | B2 | 10/2005 | Spilker, Jr. et al. |
| 6,961,020 | B2 | 11/2005 | Rabinowitz et al. |
| 6,963,306 | B2 | 11/2005 | Spilker, Jr. |
| 6,970,132 | B2 | 11/2005 | Spilker, Jr. |
| 7,042,396 | B2 | 5/2006 | Omura et al. |
| 7,042,949 | B1 | 5/2006 | Omura et al. |
| 7,126,536 | B2 | 10/2006 | Rabinowitz et al. |
| 7,260,378 | B2 | 8/2007 | Holland et al. |
| 7,372,405 | B2 | 5/2008 | Rabinowitz et al. |
| 2002/0184653 | A1 | 12/2002 | Pierce et al. |
| 2002/0199196 | A1 | 12/2002 | Rabinowitz et al. |
| 2004/0073914 | A1 | 4/2004 | Spilker et al. |
| 2004/0201779 | A1 | 10/2004 | Spilker et al. |
| 2005/0066373 | A1 | 3/2005 | Rabinowitz |
| 2005/0251844 | A1 | 11/2005 | Martone et al. |
| 2007/0050824 | A1 | 3/2007 | Lee et al. |
| 2007/0121555 | A1 | 5/2007 | Burgess et al. |
| 2007/0131079 | A1* | 6/2007 | Opshaug et al. ............ 84/1 |
| 2007/0182633 | A1 | 8/2007 | Omura et al. |
| 2007/0296632 | A1 | 12/2007 | Opshaug et al. |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

U.S. Appl. No. 11/380,691, Metzler et al.
U.S. Appl. No. 11/535,485, Furman et al.
U.S. Appl. No. 11/622,838, Rabinowitz et al.
U.S. Appl. No. 11/770,162, Furman et al.
U.S. Appl. No. 11/865,881, Opshaug et al.
U.S. Appl. No. 12/117,676, Rabinowitz et al.
U.S. Appl. No. 12/168,141, Furman et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

* cited by examiner

WIDE-LANE PSEUDORANGE MEASUREMENTS USING FM SIGNALS

CROSS-REFERENCE TO RELATED APPLICATIONS

This application claims benefit of 60/732,558 Nov. 02, 2005, the disclosure thereof incorporated by reference herein in its entirety.

BACKGROUND

The present invention relates generally to signal processing. More particularly, the present invention relates to wide-lane pseudorange measurements using FM signals.

SUMMARY

In general, in one aspect, the invention features an apparatus comprising: a receiver to receive a wireless stereo frequency-modulation (FM) signal comprising a plurality of spectral signal components including a first tone and one or more frequency bands; one or more tone generators each to generate a respective second tone based on a respective one of the frequency bands; a plurality of phase circuits each to measure a phase of a respective one of the first and second tones; and a difference element to determine a phase difference between two of the phases.

In some embodiments, a location of the receiver is determined based on the phase difference. Some embodiments comprise a processor to determine the location of the receiver based on the phase difference. In some embodiments, each of the tone generators comprises: a squaring element to generate an output comprising the respective one of the second tones by squaring the respective one of the frequency bands. In some embodiments, each of the tone generators further comprises: a bandpass filter to filter the output of the respective squaring element. Some embodiments comprise an analog-to-digital converter to digitize the FM signal before the tone generators generate the respective second tones.

In general, in one aspect, the invention features an apparatus comprising: receiver means for receiving a wireless stereo frequency-modulation (FM) signal comprising a plurality of spectral signal components including a first tone and one or more frequency bands; one or more tone generator means each for generating a respective second tone based on a respective one of the frequency bands; plurality of phase circuit means each for measuring a phase of a respective one of the first and second tones; and difference means for determining a phase difference between two of the phases.

In some embodiments, a location of the receiver is determined based on the phase difference. Some embodiments comprise processor means for determining the location of the receiver based on the phase difference. In some embodiments, each of the tone generator means comprises: squaring means for generating an output comprising the respective one of the second tones by squaring the respective one of the frequency bands. In some embodiments, each of the tone generator means further comprises: bandpass filter means for filtering the output of the respective squaring element. Some embodiments comprise analog-to-digital converter means for digitizing the FM signal before the tone generator means generate the respective second tones.

In general, in one aspect, the invention features a method comprising: receiving a wireless stereo frequency-modulation (FM) signal comprising a plurality of spectral signal components including a first tone and one or more frequency bands; generating one or more second tones each based on a respective one of the frequency bands; measuring phases of a plurality of the first and second tones; and determining a phase difference between two of the phases.

In some embodiments, a location of the receiver is determined based on the phase difference. Some embodiments comprise determining the location of the receiver based on the phase difference. In some embodiments, generating each of the second tones comprises: generating an output comprising the respective one of the second tones by squaring the respective one of the frequency bands. In some embodiments, generating each of the second tones further comprises: filtering the output. Some embodiments comprise digitizing the FM signal before generating the respective second tones.

In general, in one aspect, the invention features computer-readable media embodying instructions executable by a computer to perform a method comprising: generating one or more second tones each based on a respective frequency bands in a wireless stereo frequency-modulation (FM) signal comprising a plurality of spectral signal components including a first tone and one or more of the frequency bands; measuring phases of a plurality of the first and second tones; and determining a phase difference between two of the phases.

In some embodiments, a location of the receiver is determined based on the phase difference. Some embodiments comprise determining the location of the receiver based on the phase difference. In some embodiments, generating each of the second tones comprises: generating an output comprising the respective one of the second tones by squaring the respective one of the frequency bands. In some embodiments, generating each of the second tones further comprises: filtering the output. In some embodiments, the FM signal is digitized before generating the respective second tones.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

Embodiments of the present invention provide wide-laning techniques for obtaining pseudorange measurements using wireless frequency-modulated (FM) signals. These techniques include determining phases of multiple components of an FM signal, and employing phase differences between those phases as pseudoranges. The pseudoranges can be used by a mobile receiver to determine the position of the mobile receiver.

The general equation for the FM signal s(t) is given by Equation 1.

$$s(t) = A \cdot \cos\left(2\pi f_c t + 2\pi k_f \cdot \int_0^t m(\tau) d\tau\right) \quad (1)$$

where A is signal amplitude, $f_c$ is the carrier frequency, t is time, $k_f$ is a modulation coefficient, and m is the modulating signal.

Figure 1:
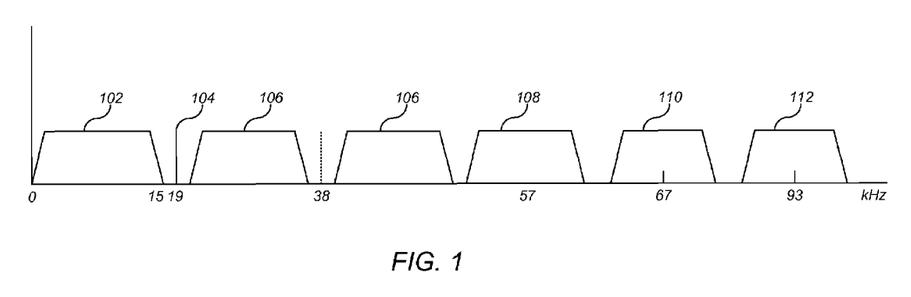
FIG. 1 shows the spectrum of the modulating signal of a conventional radio frequency (RF) stereo FM signal.

FIG. 1 shows the spectrum of the modulating signal of a conventional radio frequency (RF) stereo FM signal 100. As can be seen from FIG. 1, FM signal 100 comprises a plurality of spectral signal components including a tone and several frequency bands. In particular, FM signal 100 comprises a sum signal 102, a pilot signal 104, a difference signal 106, an optional Radio Broadcast Data System (RBDS) signal 108, and two optional Subsidiary Communications Authorization (SCA) signals 110 and 112. Sum signal 102 represents the sum of the left and right stereo channels, and is transmitted as baseband audio in the 0-15 kHz band. Difference signal 106 represents the difference between the left and right stereo channels, and is amplitude-modulated onto a 38 kHz suppressed carrier to produce a double-sideband suppressed carrier (DSBSC) signal in the 23-53 kHz band. Pilot signal 104 is a 19 kHz tone that is used by conventional FM stereo receivers to regenerate the 38 kHz subcarrier with the correct phase.

RDBS signal 108 is a low-rate data service used by many FM broadcasters in the United States (US) to transmit program and traffic information. RDBS signal 108 uses Binary Phase-shift Keying (BPSK) at a modulation rate of (19/16) kHz on a 3×19 kHz carrier, and has a 5 kHz bandwidth. The RDBS signal is standardized by the US National Radio Systems Committee (NRSC).

SCA signals 110 and 112 can be used for restricted analog audio programming or low-rate data services such as differential GPS corrections. Many of the SCA digital applications follow the formats specified in ITU-R BS.1194. SCA signal 110 generally has a 67 kHz carrier and a 15 kHz bandwidth. SCA signal 112 generally has a 93 kHz carrier and a 15 kHz bandwidth.

The recovered Signal-to-Noise Ratio (SNR) of an FM signal decreases rapidly as the Carrier-to-Noise Ratio (CNR) falls below 12 dB, the so-called "threshold of improvement" that is normally considered the lower limit for a demodulable signal. With a signal bandwidth of 150 kHz and kT of 400 e-23 W/Hz, the 12 dB CNR threshold corresponds to a receiver input level of −105 dBm. Unlike digital and AM signals, with wideband multiplexed analog FM there is no gain to be obtained by long integration prior to demodulation. The 12 dB CNR is a practical lower limit on FM receivability. For a given phase estimation accuracy with a given set of signal components, the true lower limit may be higher.

Above 12 dB CNR, the demodulated FM signal benefits from so-called "FM improvement," which can be thought of as a kind of processing gain that results from spreading a signal over a wider bandwidth. Each subcarrier of interest has a different SNR improvement relative to the CNR, depending on its bandwidth and subcarrier frequency. The formula, on a linear scale, is given by Equation 2.

$$\left(\frac{SNR}{CNR}\right) = \left(\frac{B}{B_c}\right) \cdot \left(\frac{\Delta F}{F_m}\right)^2 \quad (2)$$

where B=½ total bandwidth of the modulating signal, $B_c$=bandwidth of the subcarrier band of interest, $\Delta F$=frequency deviation of the FM signal, and $F_m$=center frequency of the subcarrier of interest.

This assumption is not strictly correct for FM broadcasts and can be compensated in some specific cases. For commercial FM with SCA1 and SCA2 active and MUX1 and MUX2 turned off, which is probably the most common configuration, $\Delta F$=75 kHz and B=61 kHz. For the pilot tone with $B_c$=1 Hz and $F_n$=19 kHz, SNR=CNR+60 dB assuming equal power. However, the pilot tone is normally injected at a level 20 dB below that of the audio, making the effective SNR =CNR+40 dB. The minimum usable signal of CNR=12 dB gives SNR=52 dB. A phase-locked loop (PLL) with a 1 Hz bandwidth will give a phase estimation accuracy of roughly 0.0025 radians (6.7 meters).

For difference signal 106, the clock can be recovered at twice the frequency of the suppressed subcarrier by squaring difference signal 106 and applying a 76 kHz narrowband filter. With $B_c$=38 kHz and $F_n$=38 kHz, SNR=CNR+7.9 dB for difference signal 106. The SNR of the recovered clock will vary with the strength of the difference signal 106, and will only be as high as CNR+7.9 dB when difference signal 106 is at full power, which is rare. The actual SNR of the recovered carrier will likely be about 10 dB lower, at CNR−2.1. For CNR=12 dB, SNR=9.9 dB. A 1 Hz PLL will give a phase accuracy of roughly 0.32 radians (201 meters). CNR may need to be well above 12 dB for this signal component to be used for positioning.

For RDBS signal 108, three clocks at 111.625, kHz, 114 kHz, and 116.375 kHz can be recovered by squaring the modulated signal. A 2375 Hz clock can be recovered by squaring the demodulated signal. With $B_c$=2375 Hz and $F_n$=57 kHz, SNR=CNR+16.5 dB. For CNR=12 dB, SNR=28.5 dB. A 1 Hz PLL will give a phase accuracy of roughly 0.038 radians (16 meters for the carrier and 764 meters for the bit clock). In all cases, additional phase errors corresponding to distances of 200 to 400 meters can be expected due to multipath in urban environments.

Wide-laning works by measuring phases of beat-frequency signals that are created when multiple pilot signals are transmitted coherently. Carrier phase measurements are very precise, but may not be very accurate. While the measurement precision within a cycle can be a small fraction of that cycle, there are generally an unknown integer number of additional cycles between the transmitter and the receiver. In the described embodiments, the phase of a beat-frequency between two signal components is taken by first measuring the phases of the components, and then taking the difference between the measured phases. In other embodiments, the phase of the beat-frequency is taken directly from the beat-frequency signal.

Wavelengths for signals in the FM band are around 3 m. The beat-frequency between the carrier and the side-band pilots can be measured in a receiver as well as side-band pilots vs. other side-band pilots. In an FM stereo signal, these beat-frequencies occur at 19 kHz intervals, with wide-lane wavelengths of c/f=299792458 [m/s]/P*19e3 [Hz]=15778.55/P [m], where P is the harmonics number. Beat-frequencies for FM stereo signal 100 are given in Table 1.

TABLE 1

| Beat-Frequency | Wide-Lane Wavelength (m) |
| --- | --- |
| 2375 Hz (from RDBS data) | 126,228.40 |
| 19 kHz (pilot) | 15,778.55 |
| 38 kHz | 7,889.28 |
| 57 kHz | 5,259.52 |
| 76 kHz (from stereo carrier) | 3,944.64 |
| 114 kHz (from RDBS carrier) | 2,629.76 |

Fundamentally, phase measurements on the 19 kHz beat-signal give pseudoranges that repeat in ~16 km intervals. While the precision of those measurements is a function of Signal-to-Noise Ratio (SNR) and multipath, the total pseudorange accuracy is determined by the ~16 km cycle ambiguity. The initial cycle ambiguity can be resolved when the receiver position is known a priori to within ±7889.28 m (2D). Once that cycle ambiguity is resolved, the higher order harmonic ambiguities can be resolved when the measurement precision of the wider-lane is better than the narrower-lane wavelength. Thus, when an ambiguity-resolved 19 kHz phase measurement is accurate to better than ±3944.64 m, the 38 kHz cycle ambiguity can be resolved.

Suitable components for wide-laning with FM broadcast signal 100 include 19 kHz pilot signal 104 and the data clock of RDBS signal 108, although other components can be used instead or as well. The first of these is the recovered RDBS data clock x2, which has a wavelength of over 126 km, greater than the receivable range of most FM broadcasts. With a minimally receivable FM signal (CNR=12 dB), the RDBS clock x2 can give a position accuracy of roughly 1 km, assuming moderate urban multipath errors. This rough position can then be used to resolve the cycle ambiguity of the 19 kHz pilot, providing a positioning accuracy on the order of 5-10 meters in the absence of multipath-induced errors.

Without good mitigation, the pseudorange error associated with a positioning signal will be roughly half of the channel delay spread. In urban canyons, this delay spread is typically hundreds of meters. The ability to mitigate multipath errors with signal processing techniques is ultimately limited by the bandwidth of the signal, with the best expected multipath resolution corresponding to roughly twice the bandwidth. For FM broadcasts, the bandwidth is 150 kHz, corresponding to a multipath resolution of 1 km. Since the best-case resolution is as large or larger than the expected multipath error, there is little point in pursuing sophisticated computational techniques for multipath mitigation. Switched diversity may be useful if the receiver can select the antenna that produces the earlier signal arrival.

Figure 2:
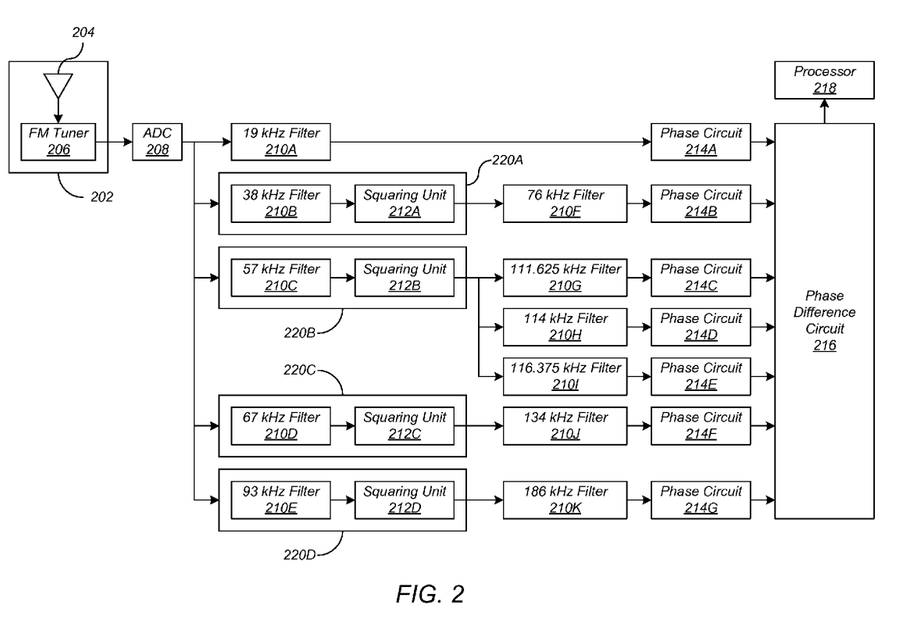
FIG. 2 shows an apparatus according to some embodiments of the present invention.

FIG. 2 shows an apparatus 200 according to some embodiments of the present invention. Although in the described embodiments, the elements of apparatus 200 are presented in one arrangement, other embodiments may feature other arrangements, as will be apparent to one skilled in the relevant arts based on the disclosure provided herein. In addition, while apparatus 200 includes elements for determining phases for each of the spectral components of FM signal 100, other embodiments can include fewer elements, for example including only the elements needed to process two of the spectral components.

Apparatus 200 includes a receiver 202 comprising an antenna 204 and a tuner 206, an analog-to-digital converter (ADC) 208, filters 210A-K, squaring elements 212A-D, phase measurement elements 214A-G, and a phase difference circuit 216. Elements 210, 212, 214, and 216 can be implemented as a digital signal processor, as software executing on a processor, as discrete elements, or as any combination thereof. Apparatus 200 can also include a processor 218.

Figure 3:
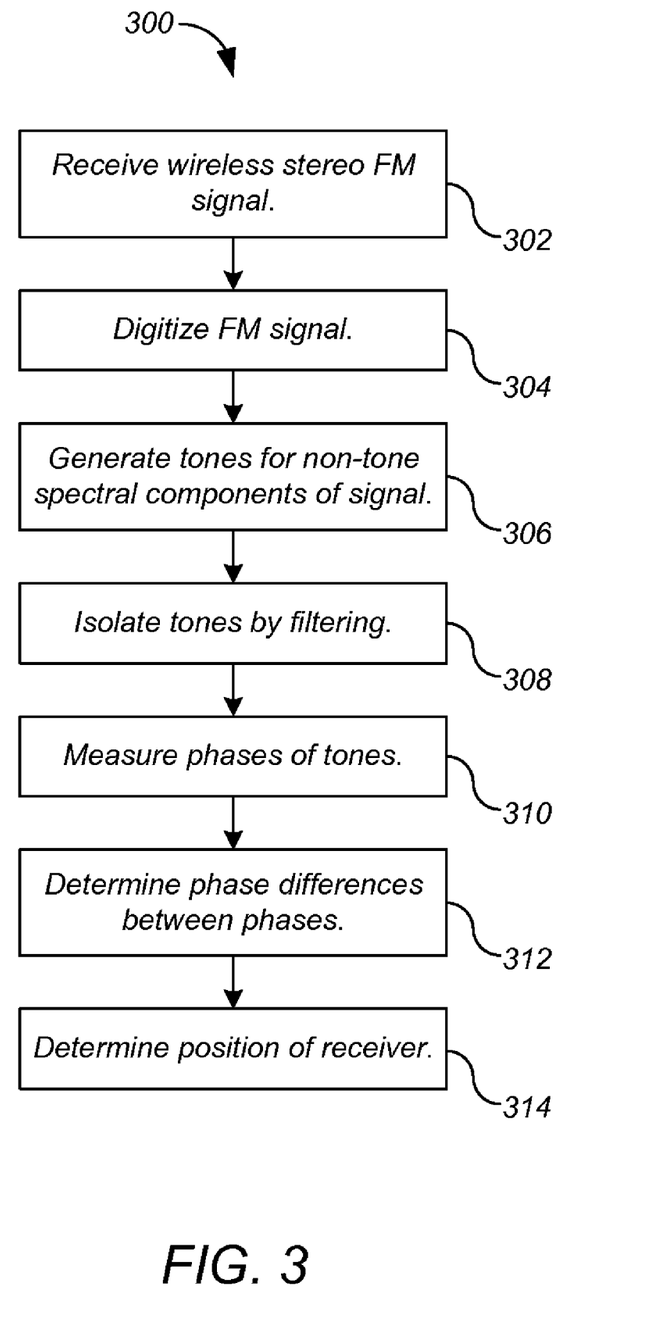
FIG. 3 shows a process for the apparatus of FIG. 2 according to some embodiments of the present invention.

FIG. 3 shows a process 300 for apparatus 200 of FIG. 2 according to some embodiments of the present invention. Although in the described embodiments, the elements of process 300 are presented in one arrangement, other embodiments may feature other arrangements, as will be apparent to one skilled in the relevant arts based on the disclosure provided herein.

Receiver 202 receives a wireless stereo FM signal (step 302). ADC 208 digitizes the FM signal (step 304). In order to determine a phase for any spectral component of the FM signal that is not a tone, a tone is first generated for that spectral component (step 306). To this end, apparatus 200 comprises a plurality of tone generators 220A-D. Of course pilot signal 104 is a tone, and so does not require a tone generator 220.

Each tone generator 220 includes a filter 210 to isolate one of the spectral components and a squaring element 212 to produce one or more tones based on the isolated spectral component. Filter 210B isolates sum signal 102. Squaring element 212A generates a tone at 76 kHz by squaring sum signal 102. Filter 210C isolates difference signal 106. Squaring element 212B generates tones at 111.625 kHz, 114 kHz and 111.375 kHz by squaring difference signal 106. Filter 210D isolates SCA signal 110, and squaring element 212C generates a tone at 134 kHz by squaring SCA signal 110. Filter 210E isolates SCA signal 112, and squaring element 212D generates a tone at 186 kHz by squaring SCA signal 112.

Apparatus 200 can also include bandpass filters 210 to isolate the tones prior to phase measurement (step 308). Filter 210A isolates the 19 kHz pilot tone 104. Filter 210F isolates the 76 kHz tone. Filter 210G isolates the 111.625 kHz tone. Filter 210H isolates the 114 kHz tone. Filter 210I isolates the 116.375 kHz tone. Filter 210J isolates the 134 kHz tone. Filter 210K isolates the 186 kHz tone. Each of the tones s(t) can be described by Equation (3).

$$s(t) = A \cdot \cos(2 \pi f t + \theta) \qquad (3)$$

where A is the amplitude, f is the frequency, t is time, and $\theta$ is the phase of the signal.

Phase circuits 214A-G each measure the phase of one of the tones (step 310). Phase circuit 214A measures the phase of the 19 kHz pilot tone 104. Phase circuit 214B measures the phase of the 76 kHz tone. Phase circuit 214C measures the phase of the 111.625 kHz tone. Phase circuit 214D measures the phase of the 114 kHz tone. Phase circuit 214E measures the phase of the 116.375 kHz tone. Phase circuit 214F measures the phase of the 134 kHz tone. Phase circuit 214G measures the phase of the 186 kHz tone. For example, each phase $\hat{\theta}$ can be estimated using Equation 4.

$$\hat{\theta} = -\tan^{-1}\left(\frac{\sum_{n=0}^{N-1} s(n)\sin(\omega_m n)}{\sum_{n=0}^{N-1} s(n)\cos(\omega_m n)}\right) \qquad (4)$$

where s(n) is the sampled representation of s(t), $\omega_m = 2\pi f_m/f_s$, $f_m$ is the frequency of the tone being processed, and $f_s$ is sample rate.

Phase difference circuit 216 determines phase differences between the phases measured by phase circuits 214 (step 312). For example, phase difference circuit 216 can include difference elements each to determine a phase difference between two of the phases.

Each phase difference can be used as a pseudorange representing the distance between receiver 202 and the transmitter of the FM signal. Using such a pseudorange in combination with other information such as pseudoranges determined from other signals such as other FM signals, TV signals, GPS satellite signals, and the like, the position of receiver 202 can be determined (step 314). In some embodiments, apparatus 200 includes a processor 218 to determine the position of apparatus 200. In other embodiments, apparatus 200 can transmit the pseudorange(s) to another unit, which determines the position of apparatus 200. The fundamental navigation equation for carrier phase measurements is given by Equation 5.

$$\hat{\theta}_u^{(i)} = d_u^{(i)} + B^{(i)} - b_u + N_u^{(i)} \cdot \lambda^{(i)} + l_u^{(i)} + v_u^{(i)} \qquad (5)$$

where $\hat{\theta}_u^{(i)}$ is a phase measurement, d is the true range between transmitter and receiver, B is the transmit clock bias, b is the receiver clock bias, N is a cycle ambiguity, $\lambda$ is the signal wavelength, l is a cable line bias and v is measurement noise.

In some embodiments, rather than sequentially tuning to individual FM signals, apparatus 200 captures and digitizes multiple FM signals contemporaneously, for example by capturing all or part of the entire FM band (87.5-108 MHz). Each FM signal is then isolated and FM-demodulated in the digital domain. Each FM signal is then processed as described above. While this technique is more processing-intensive, its advantage is that all the measurements are done at the same point in time, so a position calculation is not affected by user velocity.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   a receiver to receive a wireless stereo frequency-modulation (FM) signal comprising a plurality of spectral signal components including a first tone and one or more frequency bands;
   one or more tone generators each to generate a respective second tone based on a respective one of the frequency bands;
   a plurality of phase circuits each to measure a phase of a respective one of the first and second tones; and
   a difference element to determine a phase difference between two of the phases.

2. The apparatus of claim 1:
   wherein a location of the receiver is determined based on the phase difference.

3. The apparatus of claim 2, further comprising:
   a processor to determine the location of the receiver based on the phase difference.

4. The apparatus of claim 1, wherein each of the tone generators comprises:
   a squaring element to generate an output comprising the respective one of the second tones by squaring the respective one of the frequency bands.

5. The apparatus of claim 1, wherein each of the tone generators further comprises:
   a bandpass filter to filter the output of the respective squaring element.

6. The apparatus of claim 1, further comprising:
   an analog-to-digital converter to digitize the FM signal before the tone generators generate the respective second tones.

7. An apparatus comprising:
   receiver means for receiving a wireless stereo frequency-modulation (FM) signal comprising a plurality of spectral signal components including a first tone and one or more frequency bands;
   one or more tone generator means each for generating a respective second tone based on a respective one of the frequency bands;
   plurality of phase circuit means each for measuring a phase of a respective one of the first and second tones; and
   difference means for determining a phase difference between two of the phases.

8. The apparatus of claim 7:
   wherein a location of the receiver is determined based on the phase difference.

9. The apparatus of claim 8, further comprising:
   processor means for determining the location of the receiver based on the phase difference.

10. The apparatus of claim 7, wherein each of the tone generator means comprises:
    squaring means for generating an output comprising the respective one of the second tones by squaring the respective one of the frequency bands.

11. The apparatus of claim 7, wherein each of the tone generator means further comprises:
    bandpass filter means for filtering the output of the respective squaring element.

12. The apparatus of claim 7, further comprising:

analog-to-digital converter means for digitizing the FM signal before the tone generator means generate the respective second tones.

13. A method comprising:

receiving a wireless stereo frequency-modulation (FM) signal comprising a plurality of spectral signal components including a first tone and one or more frequency bands;

generating one or more second tones each based on a respective one of the frequency bands;

measuring phases of a plurality of the first and second tones; and determining a phase difference between two of the phases.

14. The method of claim 13:

wherein a location of the receiver is determined based on the phase difference.

15. The method of claim 14, further comprising:

determining the location of the receiver based on the phase difference.

16. The method of claim 13, wherein generating each of the second tones comprises:

generating an output comprising the respective one of the second tones by squaring the respective one of the frequency bands.

17. The method of claim 13, wherein generating each of the second tones further comprises:

filtering the output.

18. The method of claim 13, further comprising:

digitizing the FM signal before generating the respective second tones.

19. Computer-readable media embodying instructions executable by a computer to perform a method comprising:

generating one or more second tones each based on a respective frequency bands in a wireless stereo frequency-modulation (FM) signal comprising a plurality of spectral signal components including a first tone and one or more of the frequency bands;

measuring phases of a plurality of the first and second tones; and determining a phase difference between two of the phases.

20. The media of claim 19:

wherein a location of the receiver is determined based on the phase difference.

21. The media of claim 20, wherein the method further comprises:

determining the location of the receiver based on the phase difference.

22. The media of claim 19, wherein generating each of the second tones comprises:

generating an output comprising the respective one of the second tones by squaring the respective one of the frequency bands.

23. The media of claim 19, wherein generating each of the second tones further comprises:

filtering the output.

24. The media of claim 19:

wherein the FM signal is digitized before generating the respective second tones.

\* \* \* \* \*

UNITED STATES PATENT AND TRADEMARK OFFICE
CERTIFICATE OF CORRECTION

PATENT NO.        : 7,498,873 B2                                                         Page 1 of 1
APPLICATION NO.   : 11/554765
DATED             : March 3, 2009
INVENTOR(S)       : Opshaug et al.

It is certified that error appears in the above-identified patent and that said Letters Patent is hereby corrected as shown below:

On the Title Page, Item (73), replace "ROSOM" with --ROSUM--

Signed and Sealed this

Eleventh Day of May, 2010

David J. Kappos
*Director of the United States Patent and Trademark Office*